(12) United States Patent
Laish et al.

(10) Patent No.: US 8,248,985 B2
(45) Date of Patent: Aug. 21, 2012

(54) AUTOMATIC AND DYNAMIC LOGON MECHANISM IN SATELLITE NETWORKS

(75) Inventors: Isacc Ben Laish, Kfar Saba (IL); Moti Goldshtein, Hod-Hasharon (IL); Eldad Yitzhaki, Tel-Mond (IL); Elad Nachman, Rehovot (IL)

(73) Assignee: Gilat Satellite Networks Ltd. (IL)

( * ) Notice: Subject to any disclaimer, the term of this patent is extended or adjusted under 35 U.S.C. 154(b) by 463 days.

(21) Appl. No.: 12/487,384

(22) Filed: Jun. 18, 2009

(65) Prior Publication Data

US 2009/0316616 A1    Dec. 24, 2009

Related U.S. Application Data

(60) Provisional application No. 61/074,429, filed on Jun. 20, 2008.

(51) Int. Cl.
*H04B 7/185* (2006.01)

(52) U.S. Cl. .................... 370/312; 370/316; 455/3.02

(58) Field of Classification Search .................. 370/329, 370/341, 312, 315; 455/3.02
See application file for complete search history.

(56) References Cited

U.S. PATENT DOCUMENTS

2005/0053033 A1* 3/2005 Kelly et al. .................. 370/329
* cited by examiner

*Primary Examiner* — Phuoc Doan
(74) *Attorney, Agent, or Firm* — Banner & Witcoff, Ltd.

(57) ABSTRACT

In a satellite communication network, a link between a remote terminal and a traffic processor located at the hub may be used for providing services over a satellite link, such as traffic routing, protocol acceleration, data compression and data encryption. Aspects of this invention relate to methods and apparatus for automatically and dynamically associating remote terminals with traffic processors. These methods may be used for simplifying the satellite network's configuring process, especially for large scale networks, for offering load balancing between traffic processors and for offering an efficient automatic redundancy mechanism when a traffic processor malfunctions.

30 Claims, 5 Drawing Sheets

AUTOMATIC AND DYNAMIC LOGON MECHANISM IN SATELLITE NETWORKS

The present application is a non-provisional of U.S. Provisional application Ser. No. 61/074,429, filed Jun. 20, 2008, entitled "Automatic and Dynamic Logon Mechanism in Satellite Networks," the contents of which are incorporated herein by reference in their entirety for all purposes.

FIELD OF THE INVENTION

Background

A satellite communication network often includes a central hub and plurality of remote terminals (e.g. VSATs). The hub may further include one or more access controllers and one or more traffic processors. While access controllers may be configured to handle satellite access protocols and connectivity up to the second layer of the OSI model, traffic processors may be configured to perform numerous tasks related to higher layers of the OSI model, such as but not limited to making routing decisions, traffic acceleration, compression and decompression of data, encryption and decryption of data, etc. Each remote terminal may be configured to log on to one traffic processor, at least for the purposes of receiving the above mentioned services.

In most satellite communication networks, association of remote terminals to traffic processors is statically preconfigured. While this mechanism is relatively simple and straightforward, it has several downsides as well:

a. Static configuration and network scale

In order to configure the network, an allocation plan has to be prepared and then, in most cases, manually programmed and/or configured into the remote terminals and/or the traffic processors. It should be appreciated that the larger the network becomes (i.e. containing more remote terminals and additional traffic processors), the allocation plan may become more complicated and much harder to maintain through manual configuration.

Furthermore, changing the allocation plan and the static configuration derived from that plan may require service down-time, i.e. a period during which connectivity to end users could not be provided either for the entire network or for parts of it. Such a change in allocation plan may be necessary whenever traffic processors are either added or removed from the hub.

b. Load Balancing

In a network containing more than one traffic processor, using a static allocation plan may lead to an unbalanced distribution of traffic between the traffic processors. Unbalanced distribution may be a result of many reasons including mistakes in the allocation plan, mistakes in its implementation and changes in traffic profiles of remote terminals over time.

c. Redundancy

Since allocation of remote terminals to traffic processors is static, failure of a traffic processor may result in immediate loss of service for all remote terminals allocated to the failing traffic processor. Recovery from such failure may require changing the allocation plan and implementing the changes, or replacing the faulty traffic processor. Both recovery options may take considerable time to complete, during which all the remote terminals allocated to the failing traffic processor remain without service.

Therefore, in view of the above mentioned downsides, there is a need for an automatic and dynamic mechanism for logging on of remote terminals to traffic processors.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this invention include methods and apparatus that enable each remote terminal to automatically select a suitable traffic processor and log on to it.

In one aspect of this invention, each traffic processor may transmit a status message containing a status profile that may be comprised of one or more characteristics and/or metrics relating to the traffic processor itself or to the traffic it may process. The message may further include information that may be used by remote terminals to identify the traffic processor and to facilitate a log on procedure of a remote terminal to the traffic processor. The status message may be of a variable length and a self describing format, which may enable flexibility as additional information items may be added.

In another aspect of this invention, each traffic processor may repeatedly transmit the status message, where the information included in the status message may be updated from one transmission to another, at least for the purpose of providing remote terminals with an updated status of each traffic processor.

In yet another aspect of this invention, remote terminals may be configured to receive status messages from traffic processors, to calculate a rank figure for each traffic processor based on information included in received status messages, and thereafter to use said calculated rank figures for at least the purpose of selecting a suitable traffic processor. By using this automatic and dynamic selection mechanism, one or more of the downsides of the static allocation mechanism previously described may potentially be improved or resolved.

In a further aspect of this invention, the status message may further include weights parameters for one or more characteristics and/or metrics that may be included in the status message. Each traffic processor may be configured to use different weights for different characteristics and/or metrics. The weights may then be used by remote terminals at least for the purpose of calculating rank figures as described above.

In yet further aspects of this invention, a first traffic processor may be configured to notify any other traffic processors that may be included in the network's hub of any remote terminal that logs on to the first traffic processor. Consequently, a second traffic processor may close any active link to a remote terminal once the remote terminal has logged on to the first traffic processor. Furthermore, traffic processors may send routing information and/or forwarding information and/or network topology information to external routers and/or external networks, at least for the purpose of keeping a subnet or a network supported by a remote terminal accessible via said external routers and/or from said external networks. Traffic processors may further be configured to periodically send such information.

In additional aspects of this invention, the automatic and dynamic selection mechanism may be further configured to allow static configuration, when such static configuration is required. A remote terminal may be statically configured to log on to a predefined traffic processor, while a traffic processor may be configured to allow only statically configured remote terminals to log on.

BRIEF DESCRIPTION OF THE DRAWINGS

Figure 1:
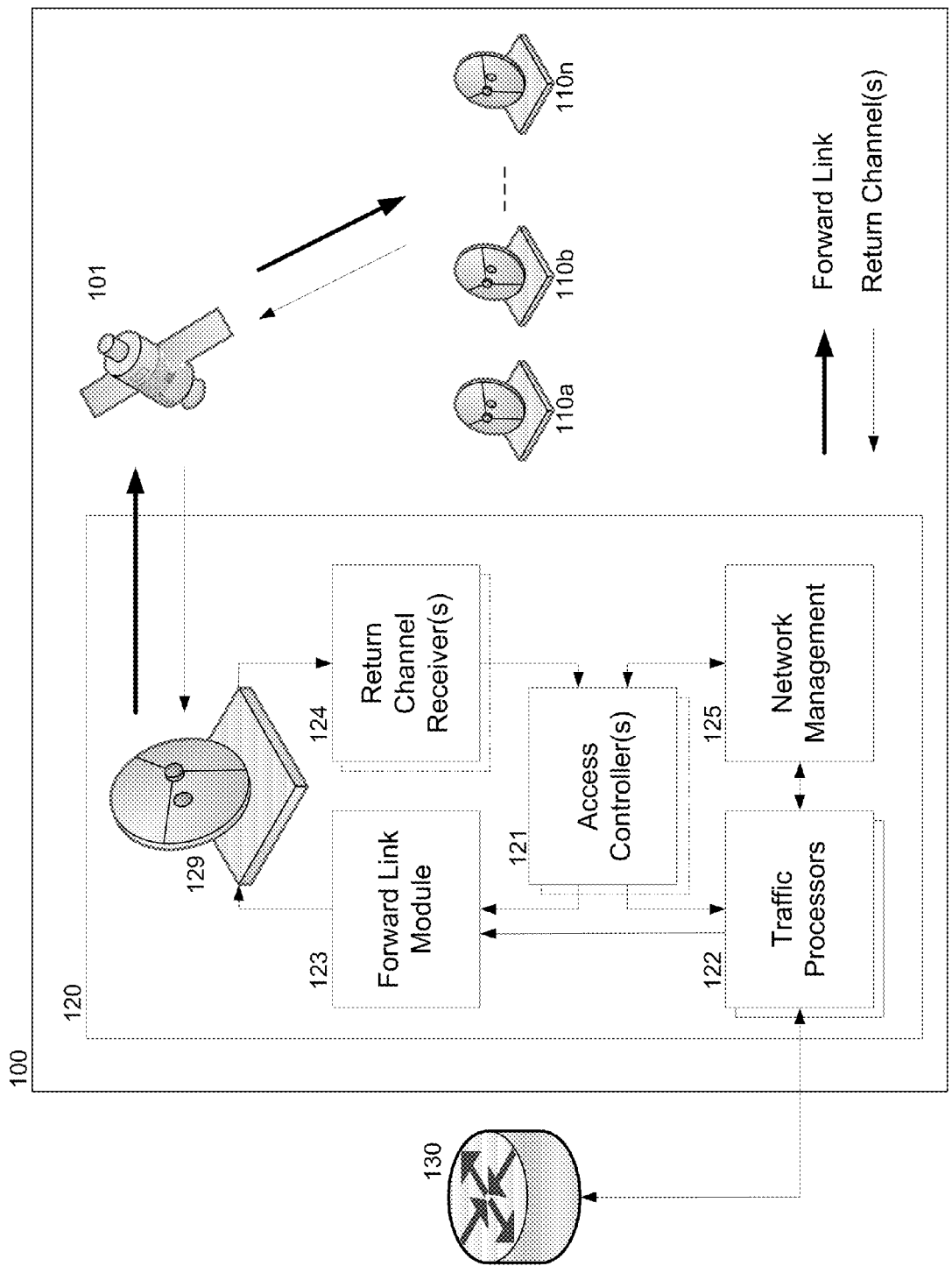

Having thus described the invention in general terms, reference will now be made to the accompanying drawings, which are not necessarily drawn to scale, and wherein:

FIG. 1 shows a satellite communication network in accordance with some aspects of the invention.

Figure 2:
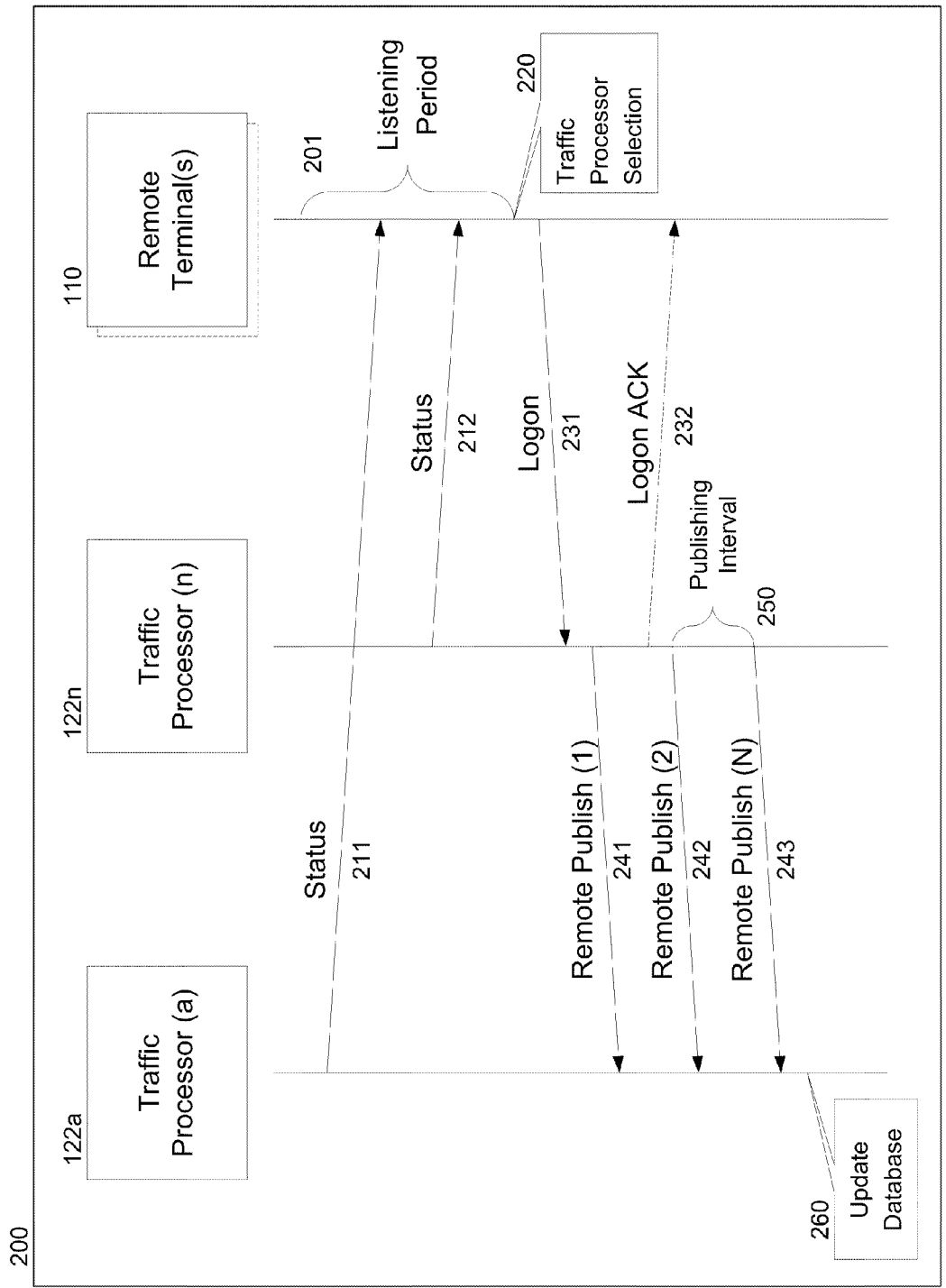

FIG. 2 shows a ladder diagram describing a logon procedure in accordance with some aspects of the invention.

Figure 3:
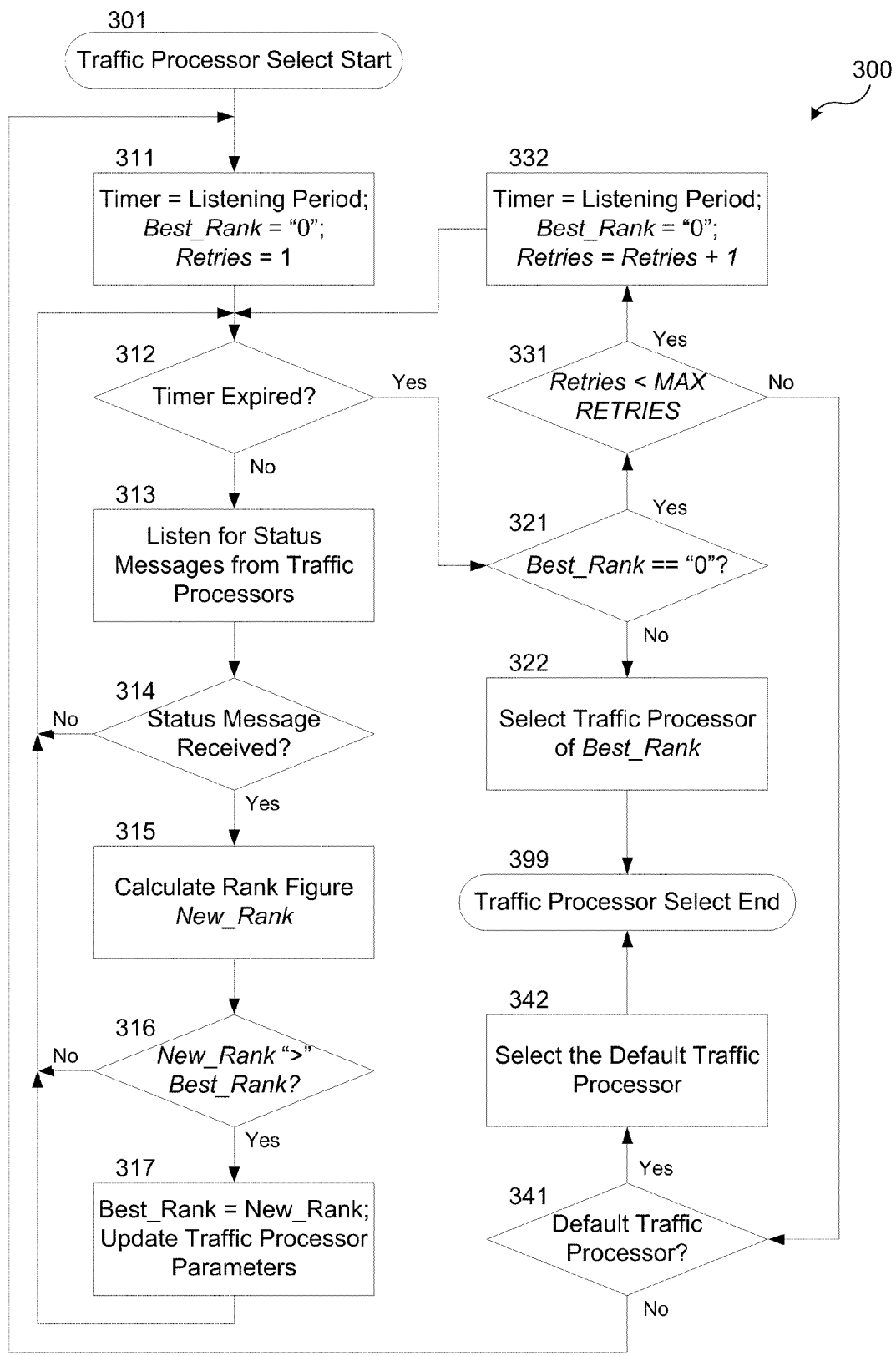

FIG. 3 shows a flow chart describing a selection algorithm that may be used by a remote terminal for selecting a traffic processor according to some aspects of the invention.

Figure 4:
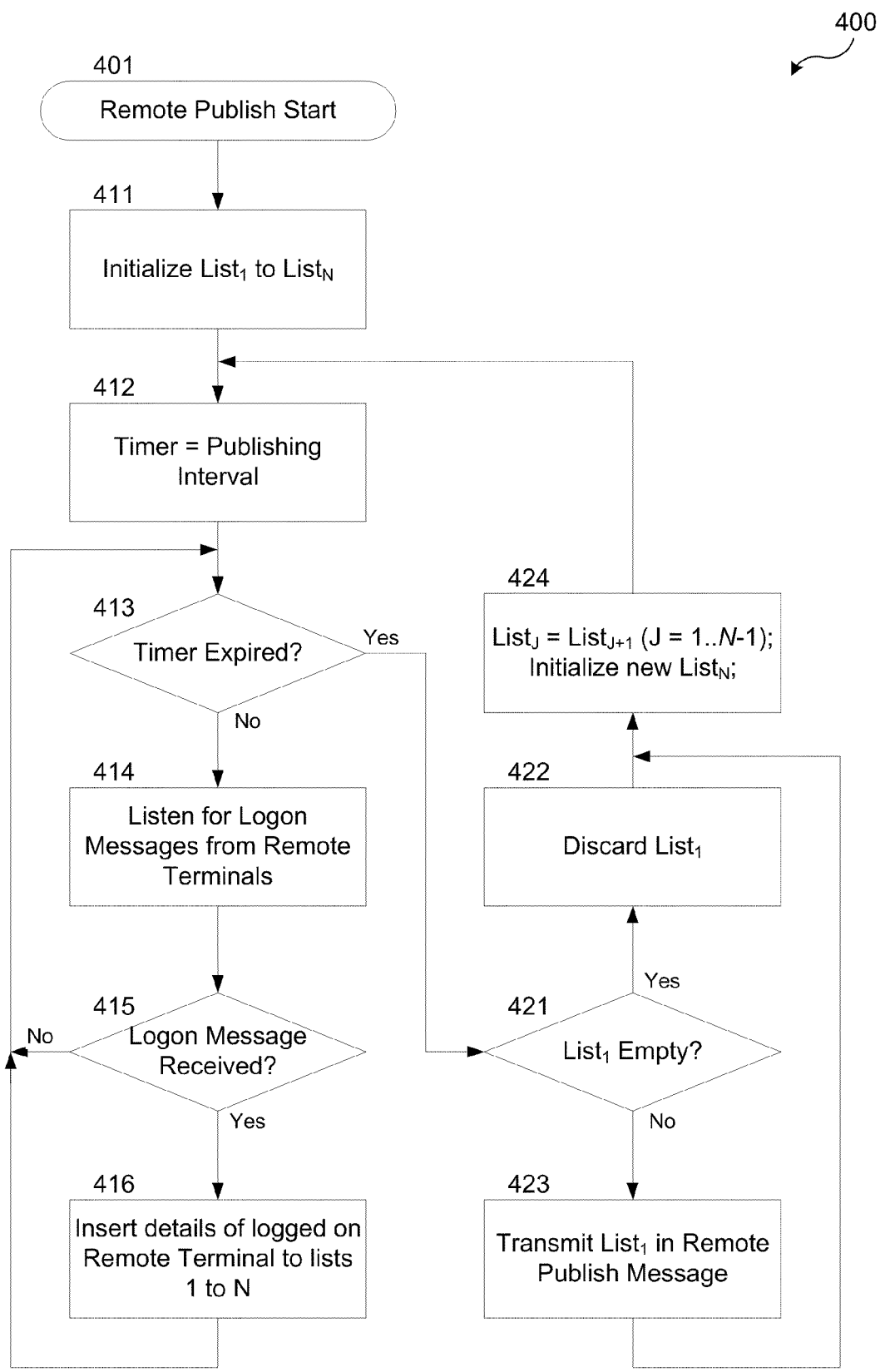

FIG. 4 shows a flow chart describing an algorithm that may be used by a traffic processor for publishing logged on remote terminals in accordance with some aspects of the invention.

Figure 5:
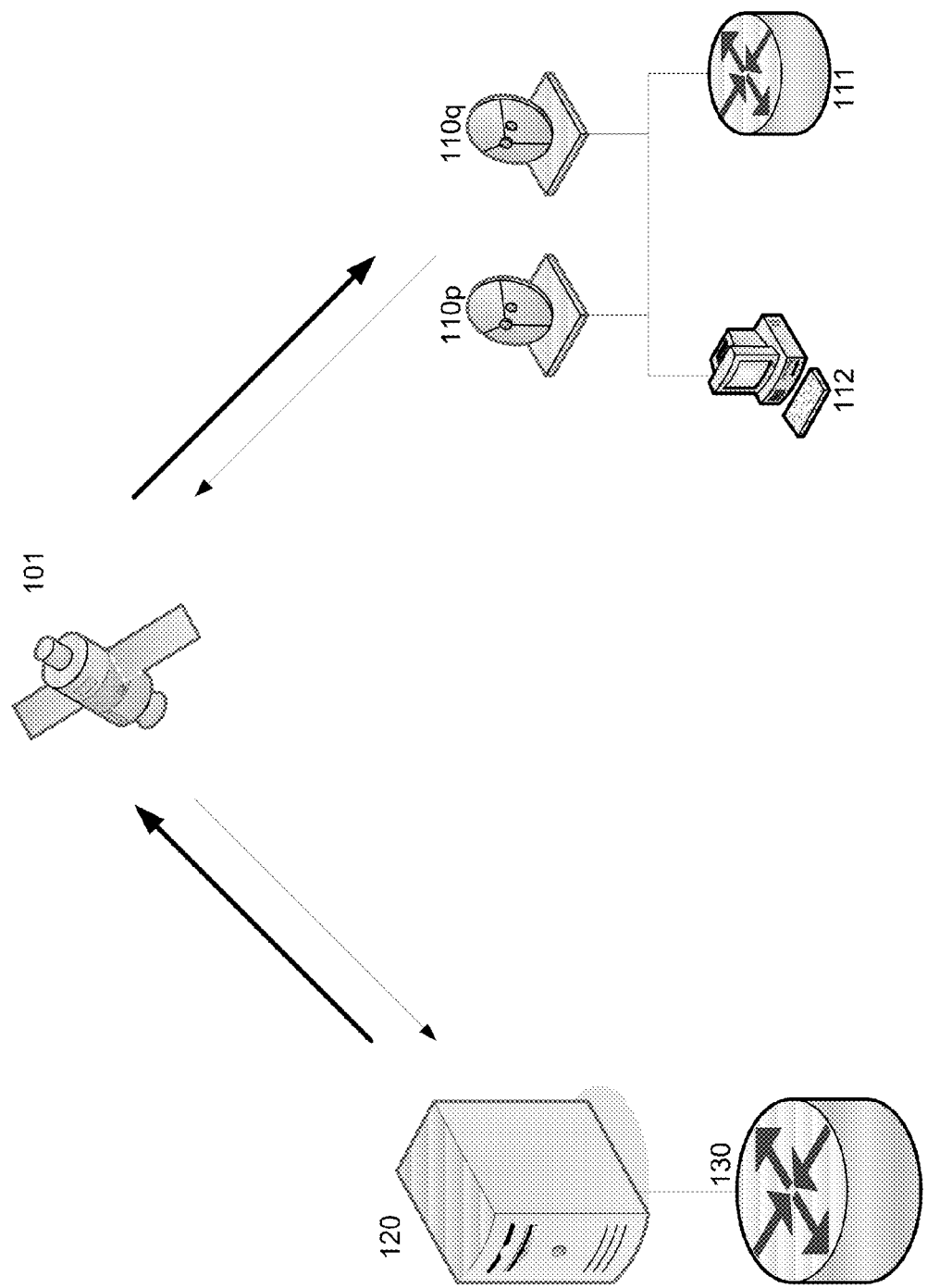

FIG. 5 shows a satellite communication network and a redundancy configuration of remote terminals in accordance with some aspects of the invention.

DETAILED DESCRIPTION

FIG. 1 shows satellite communication network 100 comprised of central hub 120 and plurality of remote terminals (VSATs) 110a to 110n, which communicate with hub 120 via satellite 101. Hub 120 further includes at least one access controller 121 and at least two traffic processors 122 coupled to access controller(s) 121. Access controller(s) 121 may be configured to implement a satellite access protocol for at least the purpose of facilitating the transfer of data between remote terminals 110 and traffic processors 122. Traffic processors 122 may be configured to perform one or more functions in regard to the exchanged data. These functions may include routing of data packets and/or data frames to and from remote terminals, accelerating traffic in one or more protocols (e.g. TCP, HTTP, etc), compressing and decompressing data, encrypting and decrypting data, etc. Hub 120 may further include forward link module 123 for at least the purpose of transmitting data towards the remote terminals, one or more receivers 124 for at least the purpose of receiving data transmitted by remote terminals towards the hub, and a network management entity 125, for at least the purpose of configuring and monitoring hub components and remote terminals. Hub 120 may further include applicable RF equipment and an antenna 129. The hub may interface external networks via router 130, which in FIG. 1 may represent actual one or more routers or one or more external networks.

Some or all the above mentioned hub components may potentially be interconnected using one or more local area networks (LAN) or any other means of connectivity, which may allow transfer of data and/or information between the various components. In some embodiments, each access controller 121 may be configured to connect to all traffic processors 122 and visa versa, at least for the purpose of enabling each remote terminal 110 to communicate with any traffic processor 122 regardless of the access controller which remote terminal 110 may be associated with.

Each remote terminal 110 may be comprised of an antenna, a satellite transmitter, a low-noise block amplifier and a processing unit. The processing unit may further include hardware and/or software for at least the purpose of transmitting and receiving data to and from the hub via satellite 101 and for receiving and transmitting user data from and to user equipment that may be connected to the remote terminal via appropriate interfaces of the processing unit (e.g. Ethernet ports, serial ports, analog telephony ports, E1/T1 interfaces, optical fiber interfaces, wireless interfaces, etc). A remote terminal 110 may be configured to implement its part of the satellite access protocol as well as any agents or modules that may be required in order to support the functions provided by the hub's traffic processors.

In satellite communication network 100, each remote terminal 110 may be configured to log on to at least one traffic processor 122, for at least the purpose of establishing a link with that traffic processor, which may then be used for various functions, including the support of the functions described above (e.g. acceleration, compression, encryption, etc). The log on procedure may follow a standard protocol or may be of a proprietary implementation. Furthermore, said satellite communication network may be configured to employ a mechanism that allows a remote terminal to dynamically and automatically select a suitable traffic processor to which it may then log on to, as described herein.

Referring to FIG. 2, each traffic processor 122 (e.g. 122a to 122n) may repeatedly transmit status messages, such as status message 211 for traffic processor 122a and status message 212 of traffic processor 122n, towards remote terminals 110 (e.g. via forward link module 123 of FIG. 1). In some embodiments, traffic processors may transmit status messages using a multicast service. Where a multicast service is used, all traffic processors may be configured to transmit on the same multicast stream (address) at least for the purpose of allowing remote terminals to be configured for listening on a single stream, regardless of the number of traffic processors that may be active at any given time. In additional embodiments, traffic processors may broadcast the status messages toward the remote terminals. Furthermore, where traffic is exchanged within the satellite communication network using the IP protocol, the least significant octet of a multicast IP address, which traffic processors may use for transmitting their status messages, may be coded to include a forward link identifier or other identifiers which may enable remote terminals to determine that they are receiving the correct stream of traffic processor's status messages.

Traffic processors 122 may be configured to include an updated status profile in each transmitted status message. The status profile may be comprised of one or more characteristics and/or metrics relating to the traffic processor itself or to the traffic it may process. In some embodiments, the status profile may be comprised of one or more of the following characteristics and metrics:

a. Processor utilization, representing the current load on the traffic processor's CPU. Where the traffic processor is comprised of more than one CPU, the traffic processor may include a separate utilization figure for each CPU and/or a single weighted utilization figure representing the relative load on all CPU units.

b. The amount of available (free) memory that may be utilized by the traffic processor's CPU. Where the traffic processor is comprised of more than one CPU and each CPU may have a separate memory bank coupled to it, the traffic processor may include a separate memory availability figure for each CPU and/or a single figure representing the total volume of available memory.

c. The total traffic throughput (e.g. in bits per second) that the traffic processor may support. The figure given may represent, for example, the maximal capability or the remaining available throughput considering the traffic processor's capabilities.

d. The total packet or frame rate (e.g. in packets or frames per second) that the traffic processor may support. The figure given may represent, for example, the maximal capability or the remaining available packet or frame rate considering the traffic processor's capabilities.

e. The number of remote terminals that the traffic processor may support. The figure given may represent, for example, the maximal capability or the number of remote terminals that may yet successfully log on to the traffic processor.

f. The number of remote terminals already logged on. The given number may be, for example, the exact current number or derived from a moving average function over a period of time prior to the transmitting of this information item.

In addition to the above characteristics and/or metrics, traffic processors may include in status messages information which may facilitate a log on procedure of a remote terminal to the traffic processor. Such information may include, for example, a traffic processor identifier, a network address (e.g. an IP address) and traffic filters (e.g. program identifiers (PID) in accordance with the DVB-S standard) for different data types (e.g. maintenance information, user traffic, multicast streams, etc). Furthermore, in a status message, a traffic processor may also include an indicator, which may indicate whether the traffic processor is configured to operate in a static mode, as described further herein.

As the status message may include various indicators, characteristics and metrics in any numerous combinations, in some embodiments a self describing format (which may result in variable message length) may be used in order to enable maximal flexibility as additional information items may be added. In certain examples, the self describing format may be based on having each characteristic, metric, indicator, identifier or any other information element represented by at least 3 fields, including an information element identifier field, an information element length field (e.g. in bytes), and the information element itself. Other methods and formats are also possible.

Referring to FIG. 3, a remote terminal may be configured to use algorithm 300 whenever it may be required to log on to a traffic processor, such as after power up and/or whenever the link between the remote terminal and the traffic processor it is currently associated with is lost (in which case a new link has to be established, either with the same traffic processor or with another traffic processor). While using algorithm 300, the remote terminal may receive several status messages (such as status messages 211 and 212 shown in FIG. 2) from one or more traffic processors, calculate a rank figure for each status message, determine a best rank figure and select the traffic processor that has scored the best rank.

In step 311, the remote terminal may set a best rank figure to an initial value ("0"), which is at least one point worse than the worst rank figure that may be calculated for an active traffic processor upon receiving its status profile. In addition, the remote terminal may also initialize a retry counter and start a timer to a predefined or a configurable interval. This interval is listening period 201, as shown in FIG. 2. In certain embodiments, the listening period may be configured to be at least 3 times the interval between consecutive status messages transmitted by the same traffic processor, for at least the purpose of ensuring high probability of a remote terminal receiving at least one status message from each traffic processor.

Further in reference to FIG. 3, as long as the listening period timer does not expire (step 312), the remote terminal may listen for status messages that may be transmitted by one or more traffic processors (step 313). Upon receiving a status message (step 314), the remote terminal may use any characteristics and/or metrics included in the received status message for at least the purpose of calculating a rank figure (New_Rank) for the traffic processor, which sent the status message (step 315). The calculation algorithm may give different weights to different characteristics and/or metrics as per their attributed importance. Such weights may be either predefined or configurable to match different needs of different networks. In some embodiments, the status message itself may further include weight figures for one or more characteristics and/or metrics that may be included in the status message. Each traffic processor may be configured to indicate different weights for different characteristics and/or metrics. A remote terminal may be configured to use the weights provided by a traffic processor in conjunction or instead of any predefined or configured weights in order to calculate the traffic processor's rank figure.

Still further referring to FIG. 3, the remote terminal may compare the calculated rank figure (New_Rank) with the best rank figure (Best_Rank) currently known to the remote terminal (step 316). In this example, if, and only if, the calculated rank figure is better than the currently known best rank figure (i.e. depending on the ranking method), the remote terminal may overwrite the best rank figure with the calculated rank figure and substitute any preserved parameters of the best ranking traffic processor with the parameters of the traffic processor associated with the calculated rank figure (step 317).

As long as the listening period timer does not expire, the remote terminal may repeat steps 312 to 317 as described above. Once the listening period timer expires, the remote terminal may select the best traffic processor discovered during the listening period (also shown as step 220 in FIG. 2). Initially, the remote terminal may determine if at least one valid rank figure has been calculated during the listening period (step 321). If a valid rank figure has been calculated, the remote terminal may select the traffic processor associated with the best rank figure (step 322), and conclude the execution of algorithm 300 (step 399).

However, if no valid rank figure has been calculated, the remote terminal may determine if another retry may be made (step 331). If another retry may be made, the remote terminal may perform step 332, which is similar to initialization step 311 with the exception of incrementing the retry counter instead of setting it to an initial value. Once the timer is rearmed to the listening period interval, the remote terminal may resume the execution of steps 312 to 317 as described above. In some embodiments, a remote terminal may be preconfigured with parameters of a default traffic processor. In such embodiments, upon failure to dynamically select a traffic processor after one or more listening periods (retries), a remote terminal may determine whether parameters for a default traffic processor are available (step 341). If a default traffic processor is preconfigured, the remote terminal may select it (step 342), and then conclude the execution of algorithm 300. However, if a default traffic processor is not preconfigured, the remote terminal may resume step 311 and execute the entire algorithm all over again, until a traffic processor may be selected.

While algorithm 300 may perform well if the listening period is relatively short (e.g. few seconds), it may perform less adequately where the listening period is longer. Since algorithm 300 records the best rank figure of any traffic processor at any given point in time during the listening period, by the time the listening period expires the traffic processor that scored the best rank figure may have a worse rank figure and another traffic processor may be more suitable at that time (i.e. has a current rank figure which is better than the current rank figure of the selected traffic processor but still worse than the best rank figure recorded during the listening period).

Therefore, in some embodiments where the listening period might be relatively long, a variation on algorithm 300 may be used. In this variation, a current rank figure is maintained for each traffic processor for which at least one status message has been received. In step 315, in addition to calculating a rank figure, the remote terminal may also unconditionally update the rank figure for the applicable traffic processor (i.e. replace the previous rank figure with the newly calculated rank figure), therefore rendering steps 316 and 317 unnecessary. Once the timer expires (step 312), the remote terminal may determine which of the current rank figures, if calculated, is the best rank figure and the algorithm may continue to step 321 as shown in FIG. 3.

Again in reference to FIG. 2, once a traffic processor has been selected (step 220), remote terminal 110 may send at least one logon message 221 to the selected traffic processor, which in FIG. 2 is traffic processor 122n. Consequently to receiving the logon message, the selected traffic processor 122n may transmit a logon acknowledge message 232 to remote terminal 110, at least for the purpose of confirming the establishment of a link between remote terminal 110 and traffic processor 122n. Furthermore, consequently to receiving a logon message from remote terminal 110, the selected traffic processor 122n may inform other traffic processors, such as traffic processor 122a, that remote terminal 110 has just logged on to it. Traffic processor 122n may include the details of remote terminal 110 in N consecutive remote publish messages, such as messages 241, 242 and 243, where such messages may be transmitted at predefined or configurable intervals, such as publishing interval 250.

In some embodiments, traffic processors may be configured to periodically (e.g., at publishing interval 250 intervals) broadcast remote publish messages using a multicast service over a local area network (LAN), to which all traffic processors and other components of hub 120 (of FIG. 1) may be connected. Where a multicast service is used, all traffic processors may be configured to transmit on the same multicast stream (address) at least for the purpose of allowing all traffic processors to be configured for listening on a single stream, regardless of the number of traffic processors that may be active at any given time.

Referring to FIG. 4, a traffic processor may be configured to execute algorithm 400. In certain examples, algorithm 400 may be used by a first traffic processor for notifying other traffic processors of remote terminals that have logged on to the first traffic processor, as described above.

Upon start of execution of algorithm 400, a traffic processor may create and initialize a predefined or a configurable number of lists (N), to which records containing applicable details of logged on remote terminals may be later on inserted (step 411). The number of lists may equal the number of times the details of each logged on remote terminal may be transmitted. Therefore this number may be set as necessary for at least the purpose of having a practical certainty that all other traffic processors receive the details of each logged on remote terminal at least once. Initially, all the lists may be empty and may contain no records. The traffic processor may then start a timer to a predefined or a configurable interval (step 412). This interval is publishing interval 250, as shown in FIG. 2.

Further referring to FIG. 4, as long as the publishing interval timer does not expire (step 413), the traffic processor may listen for logon messages that may be transmitted by one or more remote terminals (step 414). Upon receiving a logon message (step 415), such as logon message 221 of FIG. 2, the traffic processor may insert to each of the lists mentioned above ($List_1$ to $List_N$) a record containing applicable details of the remote terminal that has just logged on to the traffic processor (step 416).

As long as the publishing interval timer does not expire, the traffic processor may repeat steps 413 to 416 as described above. Once the publishing interval timer expires, the traffic processor may determine whether the first list ($List_1$) is empty or not (step 421). If the first list is empty (i.e. no remote terminal has recently logged on to this traffic processor), the first list may be discarded (step 422). However, if the first list contains at least one record (step 423), the traffic processor may transmit the content of the first list in a remote publish message, such as any of the messages 241, 242 and 243 of FIG. 2. In some embodiments, each remote publish message may include at least a traffic processor identifier, for at least the purpose of enabling each traffic processor to discard its own broadcasts. Furthermore, each record within a remote publish message may include any one or more information elements, including a remote terminal identifier, a remote terminal address (e.g. IP address), a virtual LAN (VLAN) identifier, and any other information that may be needed for updating routing tables and/or any other type of network topology related records.

Once the first list has been used and/or discarded, the traffic processor may shift the lists indexes (step 424). The previously second list may become the current first list; the previously third list may become the current second list and so on until the previously $N^{th}$ list becomes the current $N^{th}$ minus 1 list. Furthermore, the traffic processor may create a new list and initialize it as the current $N^{th}$ list, so that again there may be N lists available. Once done, the traffic processor may repeat step 412, rearm the publishing interval timer and continue executing algorithm 400 as described above.

Again, in reference to FIG. 2, consequently to receiving a remote publish message containing the details of remote terminal 110, such as messages 241, 242 and 243, traffic processor 122a may remove and/or erase from its database and/or any other data structure, which may be used for at least the purpose of storing and retrieving information on remote terminals, all information regarding remote terminal 110 (step 260) including any routing information and/or forwarding information and/or network topology information, if such information exists. In some embodiments, the removed and/or erased information may include all routing entries that may have been associated with remote terminal 110, including routes to subnets and/or networks that may be directly accessible by remote terminal 110, and routes to subnets and/or networks that may be indirectly accessible be remote terminal 110 using one or more routers, of which at least one router is directly accessible from remote terminal 110. In case traffic processor 122a has remote terminal 110 being published as logged on to it using remote publish messages such as messages 241, 242 and 243, traffic processor 122a may also remove the record referring to remote terminal 110 from any of the lists, which have not yet been transmitted.

As discussed above, certain conditions may occur where a remote terminal is simultaneously being published by more than one traffic processor. Consequently, in these examples, the remote terminal may be removed from the databases of all traffic processors. Several mechanisms may be used in order to detect and resolve such conditions or to prevent this situation from occurring. In some embodiments, a remote terminal may enforce a minimal interval between logon attempts to different traffic processors for at least the purpose of preventing the condition described above from occurring.

Furthermore, as part of step 260, consequently to removing any routing information and/or forwarding information and/or network topology information associated with remote terminal 110, traffic processor 122*a* may advertise the changes in its routing and/or forwarding information and/or network topology information tables towards any one or more actual routers and/or one or more external networks that hub 120 may interface and that may be represented by router 130 of FIG. 1. Advertising changes may refer to sending messages in accordance with applicable protocols from traffic processors to external routers (e.g. 130 in FIG. 1) or networks which the satellite network interfaces. In some embodiments, where connectivity with external networks is based on the IP protocol, such advertising may be performed using protocols such as RIP, BGP, OSPF, or any other routing/forwarding/network topology protocol.

As previously mentioned, a status message transmitted by a traffic processor may include an indicator, either an explicit one or an implicit one, which may indicate whether the transmitting traffic processor is configured to operate in static mode. In one embodiment, an implicit indicator may be implemented by setting the reported processor utilization metric to 101 percent and/or any other metrics and/or characteristics to values which are never expected to be reported by a functional traffic processor. A remote terminal receiving this status message may determine that the traffic processor is statically configured. If the remote terminal is configured to use the dynamic mechanism, it may discard this status message and thus insure that this traffic processor is not selected.

Furthermore, as previously mentioned, a remote terminal may be preconfigured with parameters for logging on to a default traffic processor. A remote terminal may further be configured not to use the dynamic mechanism described above (or to discard any received status messages) and therefore it may be able to log on only to the default traffic processor.

In yet another embodiment, remote terminals configured for using the dynamic mechanism described above may further be configured to execute a variation of algorithm 300 at all times. A remote terminal may monitor the rank figures of all traffic processors and compare the rank figure of the traffic processor it may be logged on to with the rank figures of all other traffic processors. If another traffic processor has a rank figure significantly better than the rank figure of the current traffic processor the remote terminal is logged on to, the remote terminal may send a logon message to the other traffic processor. As the other traffic processor publishes the log on of the remote terminal, the current traffic processor may remove the remote terminal from its database, as described above. Furthermore, remote terminals may be configured to use a mechanism (e.g. one based on randomizing a delay before sending the logon message to the other traffic processor) for at least the purpose of insuring that such migration is done relatively slowly and a pendulum effect is not generated.

In another aspect of the invention, FIG. 5 shows a satellite communication network (e.g., the satellite communication network 100 of FIG. 1), further comprising at least two co-located remote terminals 110*p* and 110*q*, which may be coupled to a user network comprising computers (e.g. 112), routers (e.g. 111), and/or any other equipment configured to communicate over a local area network (LAN). Remote terminals 110*p* and 110*q*, in addition to being configured to dynamically select a traffic processor as previously described, may be further configured for redundancy, for example using the Virtual Router Redundancy Protocol (VRRP). In certain embodiments, only one remote terminal out of remote terminals 110*p* and 110*q* may be active at any given time while the at least one other co-located remote terminal may be in standby. Remote terminals 110*p* and 110*q* may be further configured when in standby mode to monitor an active remote terminal and to become the active remote terminal if the active remote terminal withdraws from being the active remote terminal or malfunctions (e.g. ceases to transmit maintenance messages in accordance with the selected redundancy protocol). Furthermore, since two or more remote terminals (e.g. 110*p* and 110*q*) may be connected to the same user network, perhaps only the active remote terminal might be permitted to establish a link with a traffic processor included at hub 120 (e.g. due to various routing issues and applications aspects). In this example, a remote terminal in standby mode may be configured to establish a link with a traffic processor at hub 120 only upon becoming the active remote terminal.

However, since each remote terminal may be configured to dynamically select a traffic processor as previously described, a second remote terminal becoming active may select a second traffic processor different from a first traffic processor selected by a previously active first remote terminal. As previously described, following the second remote terminal logging on to the second traffic processor, the second traffic processor may be configured to send remote publish messages for at least the purpose of informing the first traffic processor that the second remote terminal is logged on to the second traffic processor. However, the remote publish messages in these examples may include insufficient detail describing the second remote terminal, so that the first traffic processor might not be able to deduce the redundancy linkage between the first and second remote terminals. Thus, the first traffic processor might not remove information regarding the first remote terminal from its database and/or any other data structure as previously described, at least for an unspecified period of time.

Therefore, in certain embodiments, the first and second traffic processors may be configured to use a variation of the above described remote publishing method, at least for the purpose of supporting a redundancy mechanism between at least two co-located remote terminals. In addition to including the details of the second remote terminal in the remote publish messages, the second traffic processor may be configured to include additional information that the first traffic processor may use for at least the purpose of determining whether the first remote terminal is logged on to the first traffic processor. Therefore, after receiving and processing a remote publish message from the second traffic processor, the first traffic processor may determine that it may be necessary to remove information regarding the first remote terminal from its database (and/or any other data structure as previously described) if the first remote terminal is logged on to the first traffic processor. In some embodiments, this additional information may include details of remote terminals (e.g. remote terminal identifiers) which may be configured to employ redundancy with the second remote terminal. In some embodiments, this additional information may include routing information (e.g. a virtual router IP address), which the first traffic processor may be configured to use for at least the purpose of determining whether the second remote terminal employs redundancy with any remote terminal currently logged on to the first traffic processor.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

We claim:

1. In a satellite communication network comprising a hub and plurality of remote terminals, a method for a remote terminal of dynamically associating the remote terminal with one of a plurality of traffic processors included in said hub, the method comprising:
   receiving status messages from the plurality of traffic processors over a listening period, wherein the listening period is predefined or configurable;
   identifying a status profile included in a received status message; and
   selecting a suitable traffic processor based on the identified status profile, wherein selecting the traffic processor includes:
      calculating a rank figure for a first traffic processor using the status profile included in a status message received from said first traffic processor; and
      selecting the first traffic processor as a suitable traffic processor based on the calculated rank figure and based on rank figures calculated for one or more other traffic processors from which status messages were received.

2. The method of claim 1, wherein the received status messages are transmitted using a multicast service.

3. The method of claim 2, wherein the received status messages are transmitted by the plurality of traffic processors over a same multicast stream or multicast address.

4. The method of claim 1, wherein the received status messages are transmitted using a broadcast service.

5. The method of claim 1, wherein the status profile included in a received status message comprises one or more of the following characteristics or metrics: a processor utilization metric, a memory utilization metric, a total traffic throughput metric, a total packet or frame rate metric, a supportable remote terminals metric and a currently logged on remote terminals metric.

6. The method of claim 1, wherein the received status messages further include information elements comprising one or more of the following: a traffic processor identifier, a network address, one or more traffic filters associated with one or more data streams.

7. The method of claim 1, wherein calculating the rank figure comprises using weights for one or more characteristics or metrics included in a status profile.

8. The method of claim 7, wherein said weights are included in the status profile.

9. The method of claim 7, wherein said weights are predefined or configurable.

10. The method of claim 1, wherein selecting a suitable traffic processor further comprises the following steps:
   comparing the calculated rank figure for the first traffic processor with a previous best rank figure already calculated during said listening period;
   replacing the previous best rank figure and parameters of its associated traffic processor with the calculated rank figure and parameters of the first traffic processor respectively, if the calculated rank figure is better than the previous best rank figure; and
   determining the suitable traffic processor as the traffic processor associated with the best rank figure at a time following the expiration of the listening period.

11. The method of claim 1, wherein selecting a suitable traffic processor further comprises the following steps:
   calculating a first rank figure for a traffic processor using a first status profile included in a first status message received from said traffic processor during said listening period;
   replacing said first rank figure for said traffic processor with a second rank figure calculated using a second status profile included in a second status message received from said traffic processor during said listening period;
   upon expiry of said listening period, determining a best rank figure from one or more rank figures corresponding to one or more traffic processors for which status messages were received during said listening period; and
   selecting as the suitable traffic processor a traffic processor corresponding to the best rank figure out of the one or more traffic processors.

12. The method of claim 1, further including the following steps upon expiry of said listening period:
   determining whether at least one valid status message has been received during said listening period;
   if a valid status message has not been received during said listening period, determining whether a further attempt to receive valid status messages is allowed; and
   if a further attempt to receive valid status messages is not allowed, selecting a predefined default traffic processor.

13. The method of claim 1, further comprising the following steps after selecting a suitable traffic processor:
   logging on to the selected traffic processor;
   receiving a status message from a second traffic processor different from the selected traffic processor;
   calculating a rank figure of the second traffic processor using a status profile included in said received status message from the second traffic processor;
   comparing the rank figure of the second traffic processor with a rank figure of the selected traffic processor;
   selecting the second traffic processor if its rank figure exceeds the rank figure of the selected traffic processor by more than a predetermined threshold; and
   logging on to the second traffic processor.

14. In a satellite communication network comprising a hub and plurality of remote terminals, the hub further comprising a plurality of traffic processors, a method for said hub of dynamically associating each remote terminal with one of said plurality of traffic processors, the method comprising:

periodically transmitting status messages from each of the plurality of traffic processors to each of the plurality of remote terminals, wherein every transmitted status message includes a status profile associated with the traffic processor transmitting the status message;

receiving at a first traffic processor a first log on message from a first remote terminal, wherein the first remote terminal selects to log on to the first traffic processor based on status profiles included in the status messages transmitted to the first remote terminal by the plurality of traffic processors;

transmitting a plurality of remote publish messages from the first traffic processor to the other traffic processors in said plurality of traffic processors, wherein each remote publish message includes at least one information record regarding a first remote terminal from which a log on message was received;

receiving said plurality of remote publish messages at a second traffic processor;

at the second traffic processor, identifying said first remote terminal from a record included in a remote publish message;

at the second traffic processor, removing information corresponding to the first remote terminal from a memory associated with the second traffic processor; and sending messages in accordance with applicable protocols from first and second traffic processors to routers or networks coupled with a satellite network, said messages designed to advertise changes in at least one of the following: routing tables, packet forwarding tables, network topology.

15. The method of claim 14, wherein the status messages are transmitted using a multicast service.

16. The method of claim 15, wherein the status messages are transmitted by the plurality of traffic processors over a same multicast stream or multicast address.

17. The method of claim 14, wherein the status messages are transmitted using a broadcast service.

18. The method of claim 14, wherein the status profile included in a transmitted status message comprises one or more of the following characteristics or metrics: a processor utilization metric, a memory utilization metric, a total traffic throughput metric, a total packet or frame rate metric, a supportable remote terminals metric and a currently logged on remote terminals metric.

19. The method of claim 14, wherein the transmitted status messages further include information elements comprising one or more of the following: a traffic processor identifier, a network address, one or more traffic filters associated with one or more data streams.

20. The method of claim 14, wherein transmitting remote publish messages further comprises the following steps:

creating a set of a predefined or a configurable number of empty lists;

setting a timer to a predefined or a configurable publishing interval;

upon receiving the first log on message from the first remote terminal, inserting a record associated with said first remote terminal into all said lists;

upon expiry of said timer, transmitting a first non-empty list in a remote publish message;

discarding said first non-empty list;

creating a new empty list;

setting said new empty list as the last in the set of lists; and resetting said timer to said publishing interval.

21. The method of claim 14, wherein a first information record included in a remote publish message and transmitted by the first traffic processor, said first information record regarding the first remote terminal, includes information that the second traffic processor is configured to use for at least the purpose of:

determining whether a second remote terminal is logged on to the second traffic processor, wherein the first and second remote terminals are co-located and configured to employ redundancy;

removing information corresponding to the second remote terminal from a memory associated with the second traffic processor if the second remote terminal is logged on to the second traffic processor; and sending messages in accordance with applicable protocols from the first and second traffic processors to routers or networks coupled with a satellite communication network, said messages designed to advertise changes in at least one of the following: routing tables, packet forwarding tables, network topology.

22. The method of claim 21, wherein the information included in the first information record regarding the first remote terminal comprises identifiers of remote terminals configured to employ redundancy with the first remote terminal.

23. The method of claim 21, wherein the information included in the first information record regarding the first remote terminal comprises a virtual router IP address.

24. A remote terminal in a satellite communication network comprising:

a processor; and memory storing computer readable instructions that, when executed, cause the remote terminal to:

receive status messages from a plurality of traffic processors in the satellite communication network over a listening period;

identify a status profile included in a received status message; and select a suitable traffic processor based on the identified status profile, wherein selecting the suitable traffic processor includes:

calculating a rank figure for a first traffic processor using the status profile included in a status message received from said first traffic processor; and selecting the first traffic processor as a suitable traffic processor based on the calculated rank figure and based on rank figures calculated for one or more other traffic processors from which status messages were received.

25. The remote terminal of claim 24, wherein the status profile included in the received status message comprises one or more of the following characteristics or metrics: a processor utilization metric, a memory utilization metric, a total traffic throughput metric, a total packet or frame rate metric, a supportable remote terminals metric and a currently logged on remote terminals metric.

26. The remote terminal of claim 24, wherein the received status messages further include information elements comprising one or more of the following: a traffic processor identifier, a network address, one or more traffic filters associated with one or more data streams.

27. The remote terminal of claim 24, wherein the remote terminal is configured to perform said steps following any of being powered up, restoring a communication link with a hub, and detecting that a more suitable traffic processor is available.

28. A hub in a satellite communication network comprising:
- a plurality of traffic processors; and
- memory storing computer readable instructions that, when executed, cause the hub to:
  - periodically transmit status messages from each of the plurality of traffic processors to each of a plurality of remote terminals, wherein every transmitted status message includes a status profile associated with the traffic processor transmitting the status message;
  - receive at a first traffic processor a first log on message from a first remote terminal, wherein the first remote terminal selects to log on to the first traffic processor based on status profiles included in the status messages transmitted to the first remote terminal by the plurality of traffic processors;
  - transmit a plurality of remote publish messages from the first traffic processor to the other traffic processors in said plurality of traffic processors, wherein each remote publish message includes at least one information record regarding a first remote terminal from which a log on message was received;
  - receive said plurality of remote publish messages at a second traffic processor;
  - at the second traffic processor, identify said first remote terminal from a record included in a remote publish message;
  - at the second traffic processor, remove information corresponding to the first remote terminal from a memory associated with the second traffic processor; and
  - send messages in accordance with applicable protocols from first and second traffic processors to routers or networks coupled with a satellite network, said messages designed to advertise changes in at least one of the following: routing tables, packet forwarding tables, network topology.

29. The hub of claim 28, wherein the status profile included in the transmitted status messages comprises one or more of the following characteristics or metrics: a processor utilization metric, a memory utilization metric, a total traffic throughput metric, a total packet or frame rate metric, a supportable remote terminals metric and a currently logged on remote terminals metric.

30. The hub of claim 28, wherein the transmitted status messages further include information elements comprising one or more of the following: a traffic processor identifier, a network address, one or more traffic filters associated with one or more data streams.

* * * * *